United States Patent [19]

Houghton, Jr. et al.

[11] Patent Number: 5,379,980
[45] Date of Patent: Jan. 10, 1995

[54] STABILIZATION SYSTEMS FOR VIBRATION ISOLATORS

[75] Inventors: Worthington B. Houghton, Jr., Newport Beach; Richard P. Eddy, Gardena; Jay R. McCoy, San Juan Capistrano, all of Calif.

[73] Assignee: Newport Corporation, Irvine, Calif.

[21] Appl. No.: 982,504

[22] Filed: Nov. 27, 1992

Related U.S. Application Data

[63] Continuation-in-part of Ser. No. 812,731, Dec. 23, 1991, abandoned.

[51] Int. Cl.6 .................................. F16M 13/00
[52] U.S. Cl. .................... 248/550; 248/631; 248/638
[58] Field of Search ............ 248/550, 562, 580, 610, 248/613, 618, 631, 636, 638

[56] References Cited

U.S. PATENT DOCUMENTS

| | | | |
|---|---|---|---|
| 3,578,278 | 5/1971 | Pickering. | |
| 3,598,353 | 8/1971 | De Grey. | |
| 3,730,473 | 5/1973 | Pepi. | |
| 3,784,146 | 1/1974 | Matthews. | |
| 3,889,936 | 6/1975 | Shimizu. | |
| 3,989,232 | 11/1976 | Steinbach et al. | 248/550 X |
| 4,074,474 | 2/1978 | Cristy | 248/631 X |
| 4,655,440 | 4/1987 | Eckert. | |
| 4,730,541 | 3/1988 | Greene | 248/638 X |
| 4,743,000 | 5/1988 | Karnopp. | |
| 4,815,716 | 3/1989 | Scotto. | |
| 5,042,784 | 8/1991 | Murai et al. | 248/550 X |
| 5,062,497 | 11/1991 | Ogata | 248/550 X |
| 5,067,684 | 11/1991 | Garnjost | 248/550 |
| 5,121,898 | 6/1992 | Yasuda et al. | 248/638 X |
| 5,141,201 | 8/1992 | Mizuno et al. | 248/550 |

FOREIGN PATENT DOCUMENTS

| | | |
|---|---|---|
| 430340 | 8/1967 | Switzerland. |
| 2241043 | 8/1991 | United Kingdom. |
| 1293402 | 2/1987 | U.S.S.R.. |

OTHER PUBLICATIONS

"Design of Laminar Flow Restrictors for Damping Pneumatic Vibration Isolators," Daniel B. DeBra, CIRP 34th General Assembly, (Aug. 1984).
NEWPORT CATALOG (Newport Corporation, 1989).
"The Analysis and Design of Pneumatic Systems," by Dr. Blaine W. Andersen (John Wiley 1967).

Primary Examiner—Ramon O. Ramirez
Assistant Examiner—Derek J. Berger
Attorney, Agent, or Firm—Benoit Law Corporation

[57] ABSTRACT

Intermittent stabilization of a load table supported by pneumatic vibration isolators is provided by determining a load shift condition, increasing passage of gas to the pneumatic vibration isolators and imposing external or internal damping on the load table in response to that load shift condition. For internal damping, the pneumatic vibration isolator is provided with damping fluid in one of its pneumatic chambers and a damping fluid friction passage is provided between that damping fluid in that one pneumatic chamber and the other pneumatic chamber.

22 Claims, 6 Drawing Sheets

STABILIZATION SYSTEMS FOR VIBRATION ISOLATORS

CROSS REFERENCE

This is a continuation-in-part of patent application Ser. No. 07/812,731, filed Dec. 23, 1991 now abandoned, by Jay R. McCoy, Worthington B. Houghton, Jr. and Richard P. Eddy, for Variable Vibration Isolation Systems, assigned to the common assignee hereof, and herewith incorporated by reference herein.

FIELD OF THE INVENTION

The subject invention relates to vibration isolation and isolators, typically of a pneumatic type.

BACKGROUND

In hydraulic and pneumatic vibration isolators, basic vibration isolation characteristics are determined by the spring or compliance volume around the operating piston and by the size of the gas or other fluid flow damping orifice or orifices out of that compliance volume. Traditional vibration isolators also have a damping chamber with a damping volume separated from the spring or compliance volume by the flow damping orifice or orifices.

The parameters that determine vibration isolation are dimensioned for the vibration isolation task predetermined for the particular isolator or group of isolators. While this optimizes the performance of the particular isolator for its predominantly conceived use, it renders the isolator, or the vibration isolation system in which it is used, vulnerable to most deviations therefrom.

For instance, load variations on vibration isolators provoke oscillations or instabilities that may take a long time to subside.

In this respect, pneumatic isolators and their load function may be viewed as a damped spring mass system excited by base motion. Transmissibility of the isolation systems increases above unity at the system resonant frequency, typically on the order of 1 to 3 Hz, is unity at 1.414 times the resonant frequency, and rolls off below unity at 40 db per decade at higher frequencies. The very low spring stiffness of the isolators, which provides the isolation, also results in a system which sags, or rises, large distances when masses are added to, or removed from, the payload. Moving masses on the payload have the same effect and result in tilting of the payload. The leveling control of the isolation system repositions and relevels the payload after several seconds. The minimum releveling time is limited by the natural frequency of the system; the lower the natural frequency, the better the isolation, but the longer the releveling time. These limitations of pneumatic isolations systems are generally not a problem for the laser/electro-optical laboratory user. For the industrial user, however, tilting of automated inspection equipment and long releveling times translate into increased cycle times and costs.

The accuracy and speed with which a conventional pneumatic isolation system compensates for, or tracks, changing loads is limited by the allowable gain of the mechanical/pneumatic servo system which controls the isolator level. The gain of the servo or leveling valve relates rate of air input to, or exhaust from, the isolators to a sensed error in payload level. When the level control gain is set very low, the air flow rate is slow and level corrections take place slowly. When the level control valve gain is set too high, rapid air inrush and exhaust cause the system to oscillate and become unstable.

Conventional pneumatic isolators of vibration isolation tables are typically dimensioned for given load situations. A series of such tables is sometimes used in a manufacturing process. The loads in such cases may be workpieces or similar objects that travel from table to table for successive manufacturing steps. Each time a load thus transfers from one table to the next in line, that one table is suddenly relieved, while the next table is suddenly loaded. This produces large table displacements in conventional systems that require continual re-leveling of tables. Reducing the time required for such table re-leveling is becoming more and more important in the context of the constant drive to speed up manufacturing processes.

SUMMARY OF THE INVENTION

It is an object of the invention to provide intermittent stabilization of a load table supported by pneumatic vibration isolators.

It is a related object of the invention to shorten the time previously required to re-level vibration isolation tables or apparatus in response to shifting or varying loads.

It is also an object of the invention to provide pneumatic vibration isolators with internal damping.

Other objects will become apparent in the further course of this disclosure.

From a first aspect thereof, the invention resides in a method of providing intermittent stabilization of a load table supported by pneumatic vibration isolators, comprising, in combination, supplying gas to the vibration isolators for pneumatic vibration isolation of a load, determining a load shift condition or sensing a shift in that load, increasing passage of gas to the pneumatic vibration isolators and preventing oscillation of the pneumatic vibration isolators by imposing damping on the load table in response to the load shift condition or shift in the load, and discontinuing the damping and reducing the passage of gas to the pneumatic vibration isolators for pneumatic vibration isolation of a load after cessation of the load shift condition or shift in the load.

From a related aspect thereof, the invention resides in a pneumatic vibration isolator system, comprising, in combination, a load table, pneumatic vibration isolators supporting that load table, a gas supply for these vibration isolators, a load shift determiner or load shift sensor, means connected to that load shift determiner or load shift sensor for increasing passage of gas to the pneumatic vibration isolators in response to the load shift condition or shift in the load, including means for preparing the pneumatic vibration isolators for pneumatic vibration isolation of a load by decreasing passage of gas to that pneumatic vibration isolators after cessation of the load shift condition or shift in the load and means for imposing damping on that load table in response to that load shift condition or shift in the load and including means for deactivating the damping upon cessation of the load shift condition or shift in the load.

From a further related aspect thereof, the invention resides in a pneumatic vibration isolator comprising in combination, separate pneumatic chambers, a vibration isolation piston in one of the pneumatic chambers, a gas supply for the pneumatic chambers, a gas passage between the pneumatic chambers, and a selectively actuable gas passage inhibitor connected to that gas passage between the pneumatic chambers, a damping fluid in one of the pneumatic chambers, and a damping fluid friction passage between the damping fluid in one pneumatic chamber and the other pneumatic chamber.

BRIEF DESCRIPTION OF THE DRAWINGS

The invention and its objects and aspects will become more readily apparent from the following detailed description of preferred embodiments thereof, illustrated by way of example in the accompanying drawings, in which like reference numerals designate like or equivalent parts, and in which.

DESCRIPTION OF PREFERRED EMBODIMENTS

The drawings illustrate methods and apparatus for providing pneumatic vibration isolation with intermittent stabilization in a pneumatic vibration isolator 10 or 100 including first and second pneumatic chambers 12 and 13 or 120 and 130 and a vibration isolation piston 14 or 140 operating relative to such pneumatic chambers. The drawings also show a pneumatic vibration isolator 100 with internal damping according to a preferred embodiment of the invention.

The subject invention provides the operating piston only in the first pneumatic chamber 12 or 120, and provides the second pneumatic chamber 13 or 130 separate from both the operating piston 14 or 140 and the first pneumatic chamber 12 or 120.

The first and second pneumatic chambers 12 and 13 or 120 and 130 are supplied or initially charged with gas. The most widely used gas for vibration isolation purposes is air, but the expression "gas" as herein employed is intended to be sufficiently broad to cover other compressible fluids, such gases other than air. The expressions "gas" and "pneumatic" are herein used as terms of convenience on the one hand, and as indicative of the currently preferred media on the other hand.

Gas may be applied from a pump, reservoir or other supply 16, such as via valving 18, 19 and 27 or 180 more fully described below. Generally speaking, the gas supply 16 is connected to the first and second pneumatic chambers 12 and 13 or 120 and 130, albeit not all the time. Similarly, an actuable gas exhaust 25 is connected to these first and second pneumatic chambers, such as more fully described below.

In the case of air, that exhaust may be simply an exhaust to atmosphere. In the case of a valuable gas or other fluid, the exhaust 25 may lead back to the pressure supply for recycling. On the other hand, there may be a separate exhaust for each pneumatic chamber.

Figure 1:
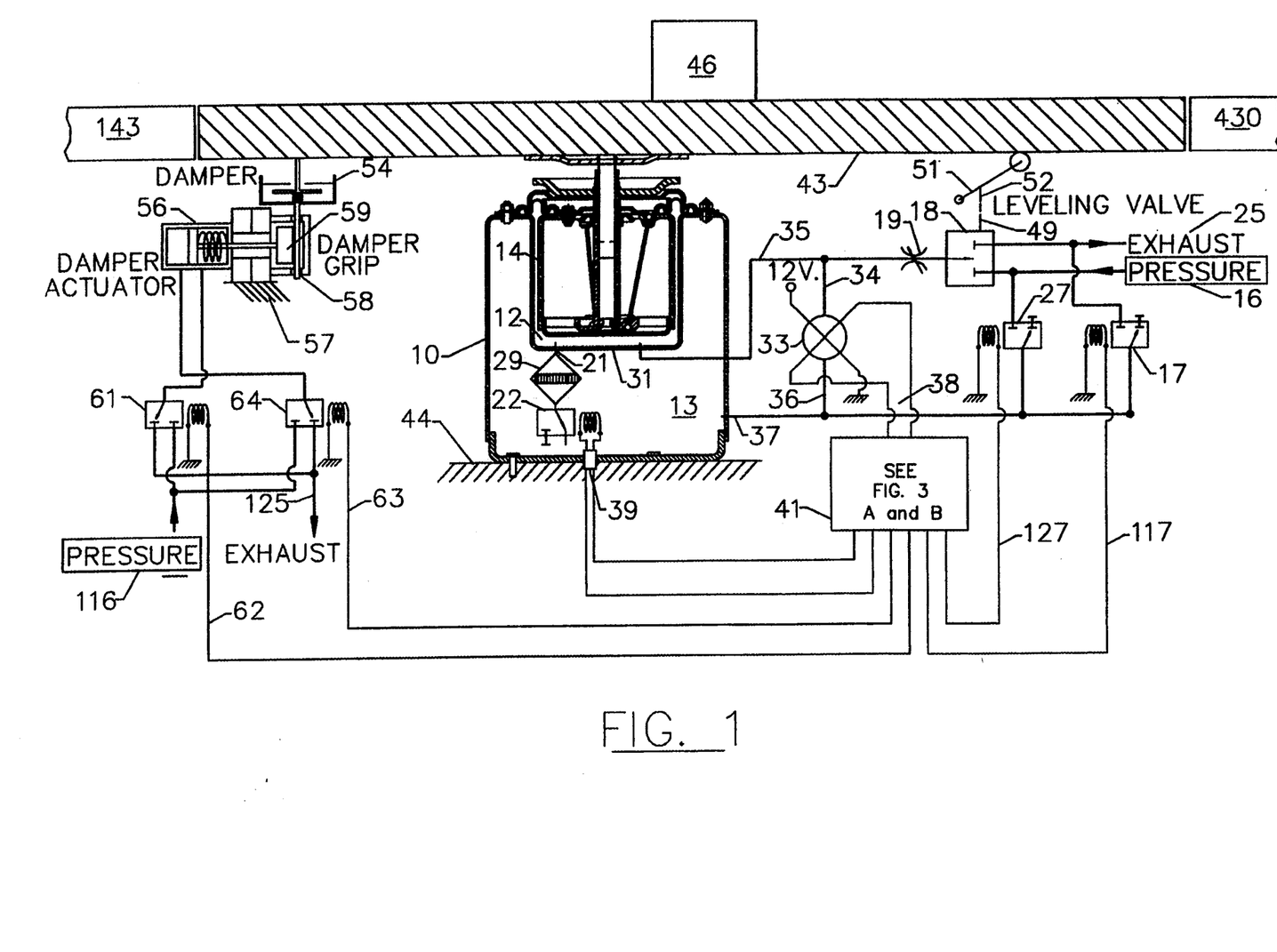
FIG. 1 is a diagram of a pneumatic vibration isolation system with intermittent stabilization according to an embodiment of the invention.
Figure 5:
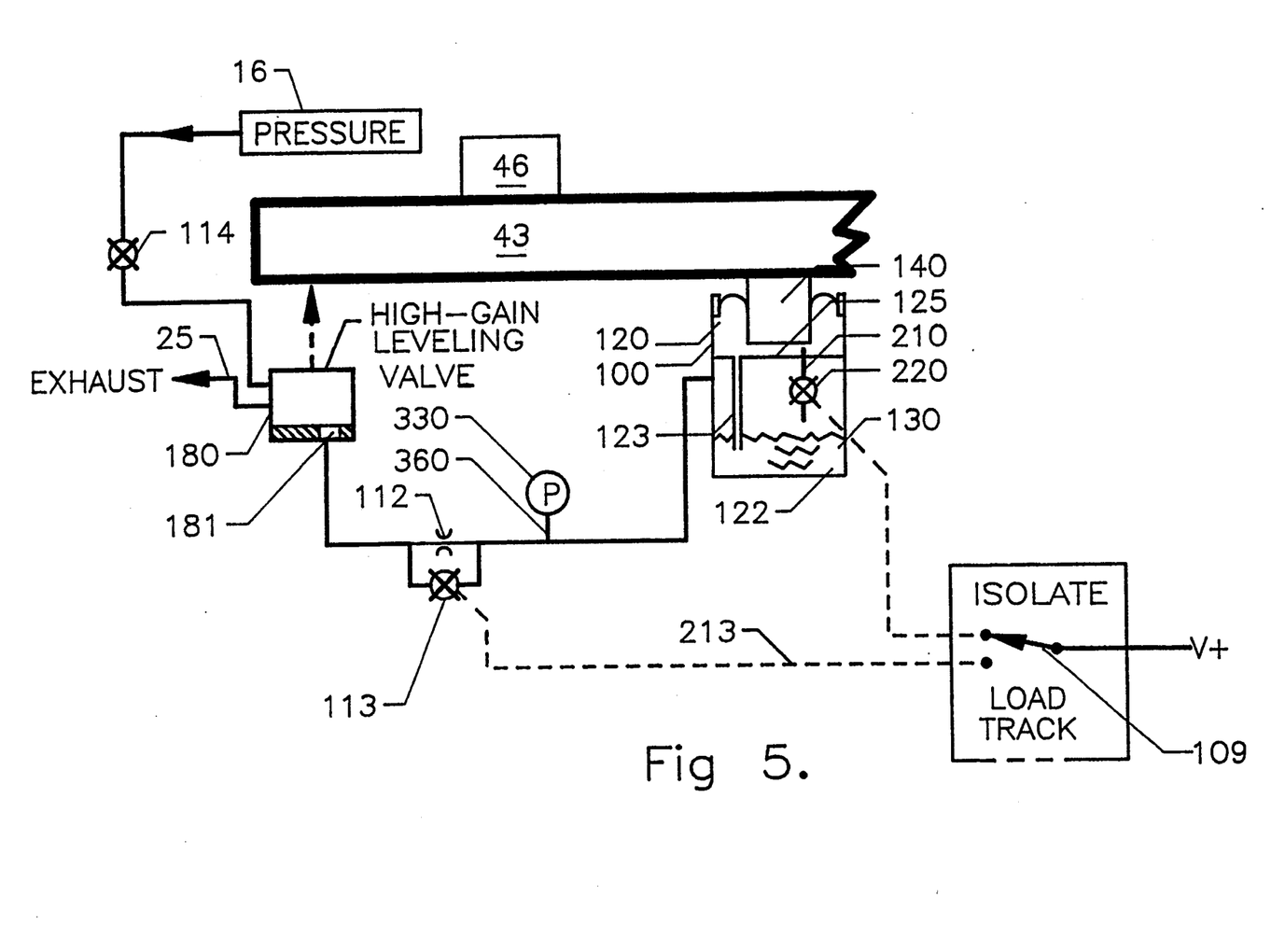
FIG. 5 is a diagram of a pneumatic vibration isolation system with internal damping for intermittent stabilization according to yet another embodiment of the invention.

The embodiments according to FIGS. 1 and 5 provide for a controlled passage of gas between the first and second pneumatic chambers 12 and 13 or 120 and 130. A variable gas passage 21 or 210 may be used for that purpose between the first and second pneumatic chambers 12 and 13 or 120 and 130. That variable gas passage may include a selectively actuable gas valve 22 or 220. The expression "gas passage variator" is herein employed to designate such valves or other means for varying the passage of gas; a dictionary expression of variator being "one that variates."

In the embodiment, illustrated in FIG. 1, the gas passage 21 is made variable by a variator 22 connected therein between the first and second pneumatic chambers. That gas passage or variator continually varies the pneumatic vibration isolation by continually controlling the passage of gas between the first and second pneumatic chambers 12 and 13.

The gas passage variator 22 may include a gas passage inhibitor between the first and second pneumatic chambers. An inhibitor, in this respect, is a gas on-off valve or another device that selectively inhibits the flow of gas. Accordingly, the component 22 in FIG. 1 or the corresponding component 220 in FIG. 5 may be called a variator, inhibitor or valve.

According to an embodiment of the invention, the pneumatic vibration isolation is provided with a first performance characteristic by inhibiting passage of gas between the first and second pneumatic chambers, such as by closure of the valve or inhibitor 22 or 220. In that case, the piston operates against the compressed gas volume in the first pneumatic chamber 12 or 120, without benefit of the gas volume in the second pneumatic chamber 13 or 130.

For example, if the pneumatic chamber 120 is the compliance chamber (alternatively called "spring chamber"), or if such compliance chamber is provided by the combined volumes of chamber 12 and 13, then such combined volume or the volume of the chamber 120 determines the natural frequency of the undamped vibration isolator, such as according to the equation:

$$\omega_0 = \left\{ \frac{ngA}{V_s} \left( 1 + \frac{P_a}{P_g} \right) \right\}^{\frac{1}{2}} \tag{1}$$

wherein:
$\omega_0$ is the natural frequency of the undamped system in radians per second,
n in the numerator is the polytropic gas constant,
g is acceleration due to gravity,
A is the cross-sectional area of the piston,
$V_s$ is the gas volume in the spring or compliance chamber,
$P_a$ is the atmospheric pressure,
$P_g$ is the gauge pressure, that is the pressure in the spring or compliance chamber above atmospheric pressure, which is dependent on the weight supported by the vibration isolator.

The mentioned n in the numerator is equal to one for low frequencies, and increases to 1.4 for high frequencies.

In this respect, if the inhibitor or gas valve 22 is open so that gas can flow between the pneumatic chambers 12 and 13 via gas passage 21 in response to movements of the piston 14, then the gas volume, $V_s$, is equal to the volumes of the first and second compliance chambers 12 and 13 and the vibration isolation frequency of the isolator 10 is substantially equal to $\omega_O$ with that volume $V_s$ pursuant to equation (1) as one aspect of the above mentioned second performance characteristic of the vibration isolator 10.

The pneumatic vibration isolation system 10 shown in FIG. 1 eliminates the bulky, external damping chamber by introducing an internal damper integral with the compliance chamber. In particular, by placing a barrier 31 as close as practical to the piston (within the limitations of maximum piston displacement and reasonable tolerancing) the small enclosed volume 12 behaves as a dashpot when the inhibitor or gas valve 22 is open, imparting a resisting pressure force on the piston 14, which force is proportional to piston velocity. Performance of this system may be described by the following equations. Because the total mass of gas in the two chambers is constant, the small displacement pressure changes are related to piston displacement by the equation $$V_d p_d + V_c p_c = PAz \quad (2)$$

wherein:
$V_d$ is the damper volume in the small chamber 12,
$p_d$ is the variation of damper pressure,
$V_c$ is the compliance volume, in the lower chamber 13,
$p_c$ is the variation of compliance pressure,
P is the absolute chamber pressure,
A is the cross-sectional area of the piston 14,
z is displacement of the mass (positive down ward).

The mass flow through the barrier 31 (inhibitor or gas valve 22 open) is presumed to be linear with pressure difference and is given by $$q = \left(\frac{Q}{\Delta P}\right)\frac{P}{RT}(p_d - p_c) \quad (3)$$

wherein:
$Q/\Delta P$ is the flow admittance,
T is the absolute gas temperature,
R is the gas constant.

Because of the small volume $V_d$ in the upper chamber 12, it may be assumed that the volumetric flow through the barrier 31 equals the volumetric rate of displacement of the piston, as long as the gas passage 21 is large or two or more gas passages 21 are provided in parallel for relatively high admittance. In equation form $$q = \rho A \dot{z} \quad (4)$$

wherein:
$\rho$ is the gas density = P/RT
The relationship of $P_d$ to z is $$(V_d + V_c)p_d = V p_d = PA(z + \dot{z}/a) \quad (5)$$

wherein:

$$a = (Q/\Delta P)p/V_c \quad (6)$$

with a being the characteristic frequency of the compliance chamber.

The equation of motion of the mass m without external disturbances is $$m\ddot{z} = -Ap_d \quad (7)$$

From Equations (5) and (7), the characteristic equation for the system disclosed in FIG. 1 is $$s^2 + (\omega_O^2/a)s + \omega_O^2 = 0 \quad (8)$$

wherein:
s is the characteristic frequency of transient motion, and
$\omega_O$ is as defined in Equation (1), being equal to $$(PA^2/mV_s)^{\frac{1}{2}} \quad (9)$$

With the inhibitor or gas valve 22 open or the barrier otherwise permeable, the structure of FIG. 1 performs its primary function of a vibration isolator 10 for loads such as 46.

On the other hand, if the inhibitor or gas valve 22 is closed, movement of the piston 14 cannot displace gas from the first pneumatic chamber 12. In that case, the effective volume becomes a fraction of the volume $V_s$ or, in other words, the value of the volume $V_s$ in equation (1) is then equal to the small volume inside the smaller first pneumatic chamber 12, which is a fraction of what the volume $V_s$ is when the valve 22 is open.

For instance, if the volume of the first and second pneumatic chambers 12 and 13 is twenty-five times larger than the volume of the first pneumatic chamber 12 alone, then the vibration isolation frequency is five times higher when the inhibitor or valve 22 is closed, than when that inhibitor or valve is open, which is one aspect of the first performance characteristic of the vibration isolator 10.

Since the product of the square of the vibration isolation frequency, $\omega^2$, and the supported mass, M (such as the mass of the table 43 and the load 46), is known as the spring constant, k, it follows that the vibration isolator 10 in our example is twenty-five times stiffer when the valve 22 is closed, than when that inhibitor or valve is open.

In general, the proportional change in stiffness, S, obtainable through closure or activation of the valve or inhibitor 22 may be defined as:

$$\Delta S = 1 + \frac{V_{13}}{V_{12}} \quad (10)$$

wherein:
$V_{12}$ is the volume of the first pneumatic chamber 12 about piston 14, and
$V_{13}$ is the volume of the second pneumatic chamber 13.

By way of example, when a load 46 transfers from one table to another, that one table is suddenly relieved, while the other table is suddenly loaded. This produces large table displacements in conventional systems that typically take an inordinate time to re-position the table. Activating the inhibitor 22 minimizes such undesirable reactions of the vibration isolation system to such and other load fluctuations.

Where an external damping chamber is omitted, an auxiliary damper 54 may be provided to lessen table oscillations, such as during load shifts, when the inhibitor 22 is activated. For regular vibration isolation operation, the damper is deactivated, so that no ground motion can reach the table 43 when the vibration isolator 10 or 100 performs its work. On the other hand, when there is a sudden shift in, or fluctuation of, the load, an actuator 56 connects the damper 54 to ground 57, such as by applying a grip to a damper rod 58 at 59, if the damper is of an oil dashpot or other type that needs to be clutched on and off. Alternatively, an electro-magnetic, pneumatic or other type of damper controlled by electric or other signals without a clutch may be employed at 54.

Before the actual operation of the vibration isolator starts, the damper grip 59 is released or the electromagnetic or other damper is deactivated.

As shown in the embodiment illustrated in FIG. 1, shifts in the load may be sensed by the differential pressure sensor 33 from an increase in the pressure of the first pneumatic chamber 12 relative to the second pneumatic chamber 13, and the damper 54 may be activated accordingly via control 41 and grip 59.

By way of example, in the quiescent state, the control 41 actuates a first electropneumatic valve 61 via a first lead 62, whereby the damper actuator 56 is connected to the pressure source 116. As more fully described below, this supports the deactivating bias of the spring shown in the damper actuator 56 and maintains the damper 54 deactivated for normal vibration isolation operation of isolator 10 or 100. The source 116 may, for instance, be the pressure source 16. A second electropneumatic valve 64 remains deactivated during normal vibration isolation by isolator 10 or 100.

Conversely, when the differential sensor 33 senses pressure or load variations, the control 41 activates the damper 54 by deenergizing the lead 62 whereby the valve 61 connects the spring chamber of the damper actuator 56 to exhaust 125, while that control 41 simultaneously energizes the lead 63 so that the valve 64 connects the left-hand chamber of the damper actuator 56 to the pressure source 116, thereby activating the damper 54. Accordingly, extra damping is provided during pressure fluctuations or load variations.

When load variations or pressure fluctuations in the isolator 10 or 100 have quieted down, the control 41 will effect release of the grip 59 or other deactivation of the damper 54, such as by deenergizing the lead 63 and reenergizing the lead 62 in response to a quieting down of the sensor input 34.

The differential sensor 33 may be of a conventional Wheatstone-bridge type, such as an MPX2000 Series Differential Pressure Sensor disclosed, for instance, in Pressure Sensors, by Motorola Inc., pp. 13–25 (1990). This type of sensor gives high isolation between the two volumes.

The differential pressure sensor 33 has two sides, one side connected to input 34 and the other side connected to input 36 in FIG. 1. By way of example, the sensor operates with a constant 12 volt D.C. voltage source applied to it. Where the sensor is basically a Wheatstone bridge, its output voltage is at half the source voltage. The output response voltage of the sensor preferably is directly proportional to the differential pressure applied to inputs 34 and 36.

The output voltage will increase above the 6 volt mid-point linearly as pressure is applied to the side of input 34 of the sensor. Inversely the voltage will decrease from 6 volts linearly as pressure is applied to the side of input 36 of the sensor.

Figure 3A:
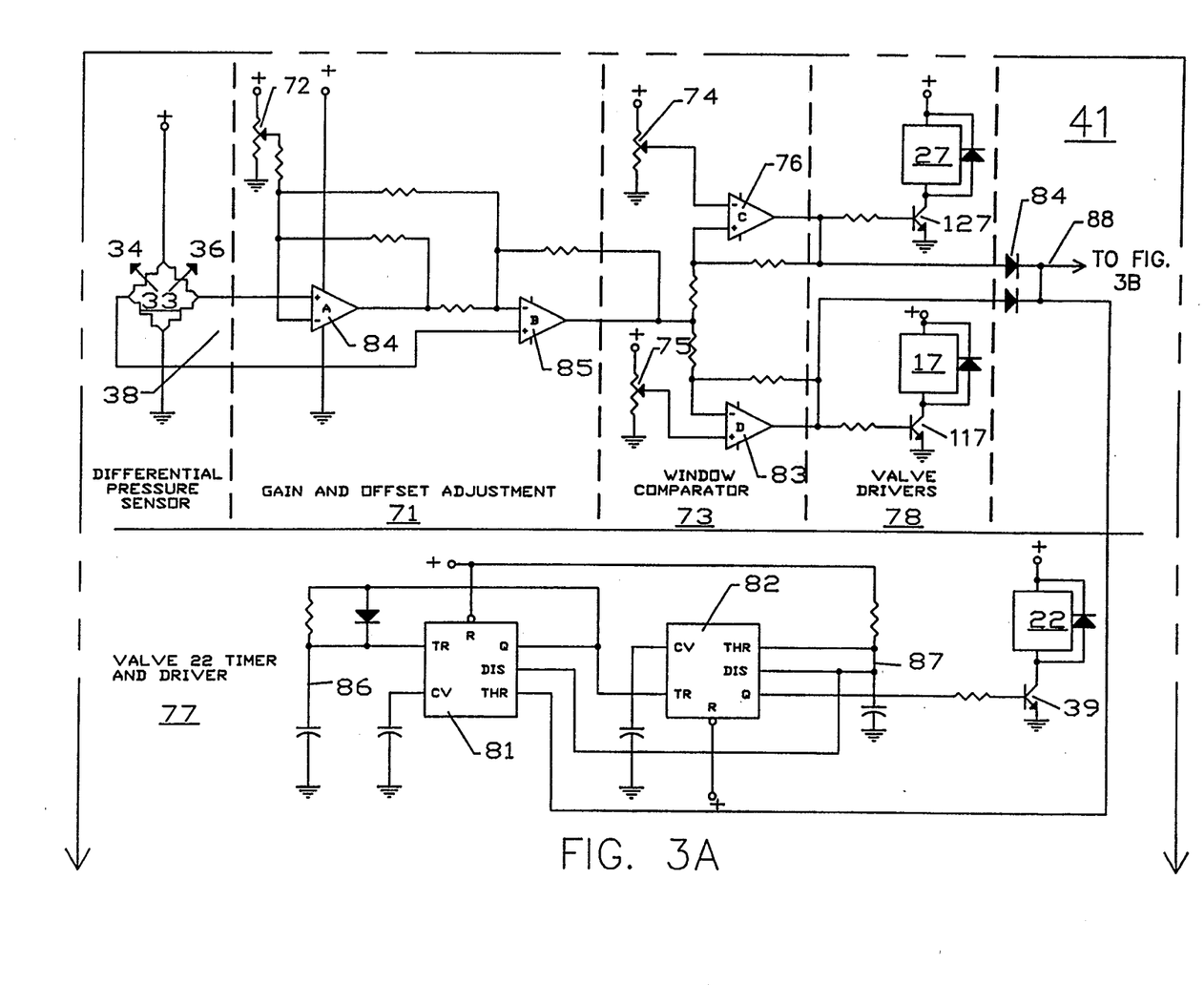
FIG. 3A is a block diagram of a vibration isolation control according to a further embodiment of the invention.
Figure 3B:
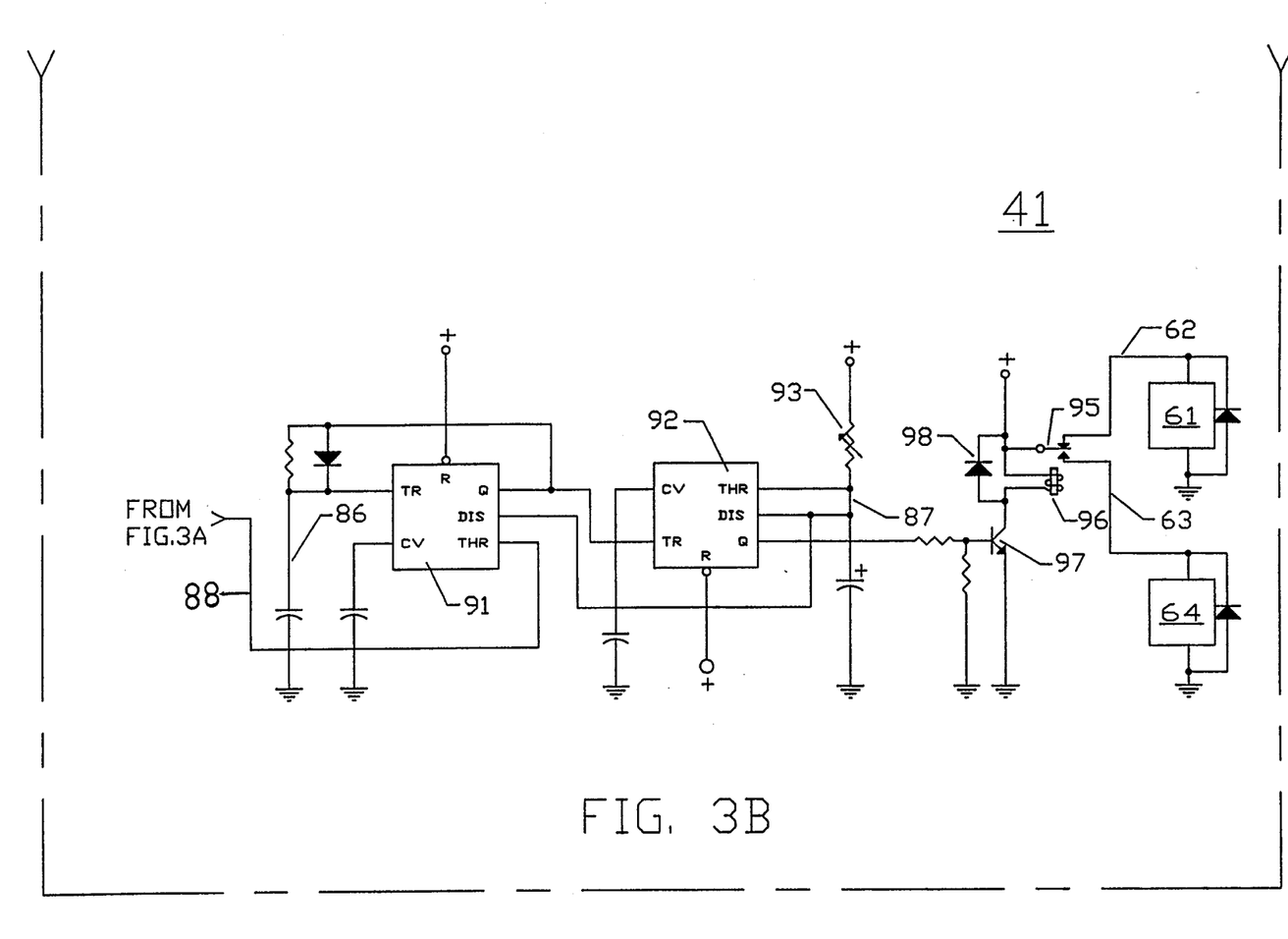
FIG. 3B is a block diagram of an external damping control according to an embodiment of the invention.

FIGS. 3A and B show an example of a control 41 with threshold comparators and valve drivers useable in FIG. 1 and other preferred embodiments of the invention.

The output of the sensor 33 shown in FIGS. 1 and 3 is applied to a gain and offset adjust circuit 71 giving it a gain of 1,000 times, for instance. This high gain increases the response of the circuit to very small differential pressures between the two volumes 12 and 13 of the vibration isolator shown in FIG. 1, for instance. The offset adjustment 72 is added to the circuit to set the output of the sensor, for instance, exactly to the mid-point of the supply voltage.

A window comparator 73 is used to set an upper threshold point and a lower threshold point for the output of the two sides of the pressure sensor with the aid of potentiometers 74 and 75. When the side connected to input 34 is at a higher pressure relative to the side connected to input 36 or the pressure in volume 12 is higher than the pressure in volume 13, such as when the piston 14 is depressed downwardly by the load 46, the upper comparator 76 will go high and turn on the solenoid valve 22 via a valve driver and timer circuit 77. At the same time, the high signal turns on the solenoid driver for valve 27 via valve driver circuit 78.

Valve 22 closes off the connection between the two volumes 12 and 13. As seen in FIG. 1, valve 27 is connected to the air supply 16 and will increase the pressure in volume 13 until it is equal to the pressure in volume 12. Timing circuits 81 and 82 may be provided to stabilize operation by delaying opening of the valve 22 until the pressure in chamber 12 has stopped varying and the pressure in chamber 13 is essentially equal to the pressure in chamber 12.

When the pressure in volume 13 is higher than the pressure in volume 12, the lower comparator 83 goes high. This also turns on the driver for solenoid valve 22 via OR element 84. The high signal of the lower comparator 83 also turns on the driver for the solenoid valve 17, because the pressure in volume 13 is now higher than in volume 12. Solenoid valve 17 exhausts air from volume 13. Once the pressures are equal and the timer for valve 22 has timed out, the system will go back to a quiescent state or normal vibration isolation operation.

According to FIGS. 3A and B, the output of the OR element 84 is also applied via a line 88 to a pair of timing circuits 91 and 92 that may be similar to the timing circuits 81 and 82, have similar timing circuits 86 and 87, and may be similarly connected. The time delay imposed by the pair of timing circuits 91 and 92 may be adjustable, as indicated by the potentiometer 93, and similar time delay adjustability may, of course, be provided in the embodiment of FIG. 3A.

In the absence of energization through line 88, the above mentioned valve 61 is energized through the normally closed side of a double-throw relay contact 95 and its first lead 62. As described above, this pressurizes the spring chamber of the damper actuator 56 which deactivates the damper 54, since the right-hand chamber of that actuator 56 is maintained exhausted as long as the other valve 64 is in its illustrated rest position.

The vibration isolator 10 or 100 thus performs its normal vibration isolation function of table 43 and load 46.

However, if the output of the OR element 84 is energized by the circuitry shown in FIG. 3A in the manner described above for timing circuit pair 81 and 82 and valve 22, then the second timing circuit pair 91 and 92 also receives an input through lead 88, causing it to energize the relay 96 via relay driver 97 after a predetermined or set time delay that prevents too rapid a connection of the auxiliary damper 54 to the table 43.

On the other hand, the timing circuits 91 and 92, like the timing circuits 81 and 82, may be omitted in applications where such omission would not cause instability. Alternatively, the energization of valves 22, 61 and 64 may be instantaneous and their deenergization delayed, and vice versa, or the time delays may be different for energization and deenergization, all depending on the requirements of the particular installation.

In either case, energization of the relay 96 closes the normally open side of the double-throw contact 95, thereby deenergizing the first lead 62 and energizing the second lead 63 shown in FIGS. 1 and 3B. Such deenergization of the first lead 62 deenergizes the first valve 61 which thus returns to its position solidly illustrated in FIG. 1, whereby the spring chamber of the damper actuator goes to exhaust. Simultaneously, energization of the second lead 63 causes the second valve 64 to pressurize the left-hand chamber of the damper actuator 56. In consequence, the damper actuator 56 clutches the damper 54 to ground at 57 to 59.

Generally speaking, energization of the relay 96 activates the damper 54, if necessary after a time delay, in the manner shown in FIGS. 1, 3A and 3B, or in any other manner within the scope of the invention.

When the load variations and pressure fluctuations in the isolator 10 or 100 have quieted down, the output signal of the OR element 84 will cease in the lead 88. While this will result in a timed opening of the valve 22 as described above, it will also cause a timed reenergization of the valve 61 and deenergization of the valve 64, whereby the damper 54 is again deactivated for normal vibration isolation of the system by one or more isolators 10 or 100.

A diode 98 around the winding of relay 96 and similar diodes around valves 17, 22, 27, 61 and 64 may serve to prevent an occurrence of voltage spikes and noise during deenergization of the relay or valve windings.

By way of example, quadruple operational amplifiers of the type LM324, shown in Texas Instruments Linear Circuits Data Book 1989, pp. 2-33 to 2-35, may be used at 76, 83, 84 and 85 in FIG. 3A. That Data Book on pp. 4-49 to 4-52 also shows dual precision timers that may be used at 81 and 82 in FIGS. 3A and 91 and 92 in FIG. 3B, with the trigger (TR), threshold (THR), discharge (DIS), reset (R), and output (Q) terminals and RC circuits 86 and 87 interconnected as shown in FIG. 3 by way of example.

Further by way of example, the valve drivers in circuits 77 and 78 in FIG. 3A and the relay driver 97 in FIG. 3B may be of a TIP-type as shown in the Motorola Bipolar Power Transistor Data Book 1987, pp. 3-1156 and 3-1157. The blocks 17, 22, 27, 61 and 64 in FIGS. 3A and B may be considered as the entire solenoid valves shown at 17, 22, 27, 61 and 64 in FIG. 1.

Figure 4:
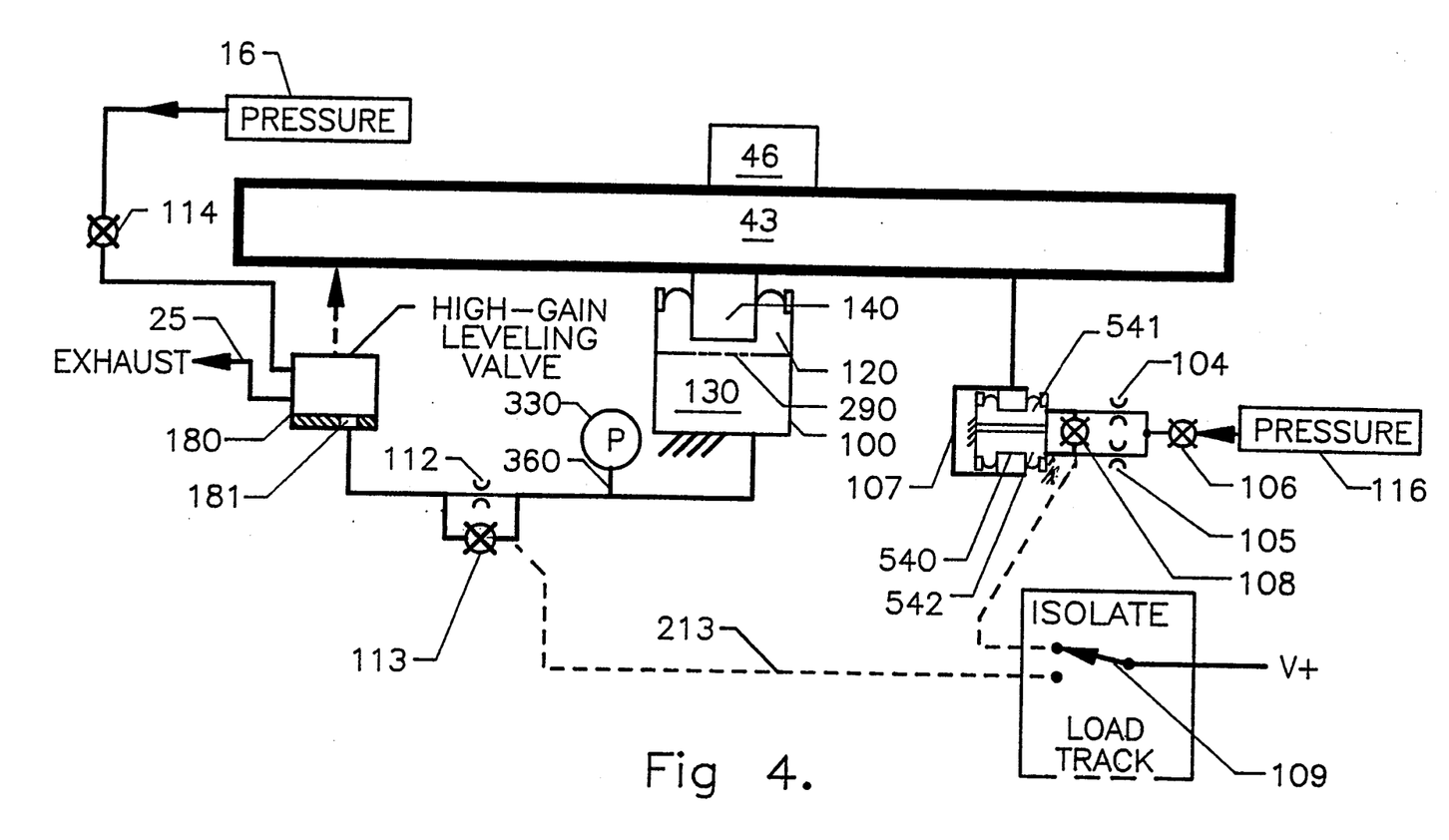
FIG. 4 is a diagram of another pneumatic vibration isolation system with intermittent stabilization according to a further embodiment of the invention.

Equation (8) shows that because of innovative design features, the vibration isolator 10 in the system of FIG. 1 when the inhibitor or gas valve 22 is open or the barrier 31 is otherwise permeable, may be characterized dynamically by that second-order equation rather than by the third-order equation applicable to systems of the type shown in FIGS. 4 and 5.

In particular, vibration isolator 100 is governed by the following third-order dynamic equation when the gas passage or orifice 210 is open, such as by opening the inhibitor or gas valve 220:

$$s(s^2+\omega_n^2)+a(1+\alpha)[s^2+\omega_n^2/(1+\alpha)]=0 \quad (11)$$

wherein:
$\omega_n$ is the natural frequency of the undamped system without damping chamber 130,
s is the characteristic frequency of transient motion,
$\alpha$ is the ratio of the damping chamber 130 volume to the compliance chamber 120 volume,
a is the characteristic frequency of the damping chamber 130.

The natural frequency $\omega_n$ is given by the Equation (1) modified as follows:

$$\omega_n=\omega_O(1+\alpha)^{\frac{1}{2}} \quad (12)$$

By way of example, the ratio $\alpha$ is around 2 or 3 in a general case, although it may be higher, such as in Professor DeBra's Pneumatic Vibration Isolator disclosed in his above mentioned CIRP Paper. For $\alpha=2$ the undamped natural frequency of the vibratory motion is $\omega_O=0.76\omega_n$. If we were to assume that the total volume is a compliance volume, the frequency would be $\omega_O=0.58\omega_n$.

From this it follows that it is primarily the gas volume, $V_s$ of the compliance chamber 120 that determines the natural vibration isolation frequency of the vibration isolator 100, modified by interaction with the damping chamber 130.

The lower chamber 130 is governed by the following equations:

$$q=(Q/\Delta p)(p_c^2-p_d^2)/2RT \quad (13)$$

$$\dot{p}V_d/RT=\dot{p}_dV_d=q \quad (14)$$

using the symbols defined above for Equations (2) to (7).

Equations (11) to (14) show that the damping chamber pressure follows changes in the compliance chamber with a first order lag at the frequency "a" defined as follows:

$$a \triangleq (p/V_d)(Q/\Delta p) \quad (15)$$

wherein:
p is the absolute pressure in the damping chamber,
$V_d$ is the damping chamber volume 130,
Q is the volumetric gas flow rate,
$\Delta p$ is the pressure difference at which Q is measured or calculated.

Since Equation (11) is third order in s, the motion of the supported mass 43, 46 is usually characterized by a damped vibratory motion plus a first order exponential motion. The equation for maximum damping for a given $\alpha$ is $$\zeta_{max}=[(1+\alpha)^{\frac{1}{2}}-1] \quad (16)$$

In terms of the natural frequency, $\omega_n$, defined above, maximum damping occurs when $$a=\omega_n/(1+\alpha)^{\frac{1}{2}} \quad (17)$$

The undamped natural frequency and the frequency of the first order exponential motion at maximum damping is $$\omega_O = \omega_n/(1+\alpha)^{\frac{1}{2}} \qquad (18)$$

Accordingly, if the inhibitor or gas valve 220 is open, the piston vibrating in the first or compliance chamber 120 can displace gas through the passage 210 into the second or damping chamber 130, whereby the vibration isolator 100 has a damped characteristic with lowered vibration isolation frequency, such as described in Equations (11) and (15).

On the other hand, if the first pneumatic chamber 120 is the compliance chamber as in FIGS. 4 and 5, then the vibration isolation frequency of the isolator 100 essentially is the frequency, $\omega_O$, of the undamped system according to equation (1), if the inhibitor or gas valve 220 is closed. This is thus one aspect of a first performance characteristic of the vibration isolator 100. The damped characteristic mentioned in the preceding paragraph may conversely be considered as a second performance characteristic.

In some applications, closure of the inhibitor or gas valve 22 or 220 and/or increase of pressure in the chamber 13 or 130 may cause the vibration isolator 100 to act like an oscillator. According to an embodiment of the invention, this can be countered by combining the isolator with one of the damping systems more fully disclosed below.

Gas may be supplied to the first and second pneumatic chambers 12 and 13 or 120 and 130, such as from the supply 16 via valve 18 or 180 in the lower position and/or valve 27 in the open position, while inhibiting passage of gas between the first and second pneumatic chambers 12 and 13 or 120 and 130, such as by closure of the inhibitor or valve 22 or 220 in FIGS. 1 and 5.

Valve 18 or 180 may be a level control valve or leveling valve for continually restoring a level or position of the piston 14 or 140 or of the table 46 or supported mass during the operating condition of the vibration isolator 10 or 100. For this or any other purpose, gas may be exhausted from the first and second pneumatic chambers 12 and 13 or 120 and 130, such as via valve 18 in the upper position and/or a valve 17 in an open condition. Passage of gas between said first and second pneumatic chambers 12 and 13 or 120 or 130 may be inhibited, as in FIGS. 1 and 5.

By way of example, passage of gas between the first and second pneumatic chambers may be inhibited and gas may be supplied to these first and second pneumatic chambers in response to a pressure increase in the first pneumatic chamber 12 or 120, such as by depression of the piston 14 or 140 by a shifting load or mass.

Conversely, passage of gas between the first and second pneumatic chambers may be inhibited and gas is exhausted from these first and second pneumatic chambers in response to a pressure decrease in the first pneumatic chamber 12 or 120, such as by upward movement of the piston 14 or 140 when a load or mass lightens.

A gas flow restrictor 29 may be provided between the first and second pneumatic chambers 12 and 13 or 120 and 130, such as in the gas flow passage 21 or 210. In this respect, within the scope of the invention, the gas flow passage 21 may be provided internally or externally of the isolator 10 or 100.

In either case, pneumatic vibration isolation may be varied by varying gas flow through the restrictor 29 or 290 between the first and second pneumatic chambers 12 and 13 or 120 and 130.

In a preferred embodiment of the invention, a laminar gas flow restrictor is provided at 29 or 290 between the first and second pneumatic chambers, and the pneumatic vibration isolation is varied by controlling laminar gas flow through that restrictor between the first and second pneumatic chambers 12 and 13 or 120 and 130. Similar orifices or flow restrictors 290 may be provided between the first and second chambers 120 and 130 in FIG. 4, whereby that isolator 100 performs as mentioned above with respect to Equation (1) in the vibration isolation mode.

By way of example, laminar flow restrictors of the type disclosed by Daniel B. DeBra, in Design of Laminar Flow Restrictors for Pneumatic Vibration Isolators (CIRP 34th General Assembly, August 1984) may be employed at 29 or 290. Alternatively, porous sintered metal elements or other flow restrictors with manifold gas passages therethrough may be used at 29 and 290.

When chosing or designing the flow restrictor 29 or 290, two completely different types of phenomena should be considered. One is low frequency-high amplitude vibrations in which gas is made to pass through the restrictor at displacements and frequencies anticipated during isolation and re-positioning. Standard mass flow considerations may be used in this respect. The other phenomenon concerns low amplitude-high frequency vibrations experienced during isolation where energy is conducted on a molecular level in the form of acoustic waves. The gas does not actually pass through the restrictor in that mode; only the energy passes through in molecular wave motion.

A porous filter type of laminar flow restrictor is preferably chosen to ensure that the resistance to flow at the low frequency-high amplitude mode will vary linearly with the expected velocities of the gas through the restrictor. The significant advantage of using the porous filter type of laminar flow restrictor is that for small amplitude-high frequency ground motions, the gas molecules do not actually pass through the porous filters. There is no mass flow through the filters and the barrier between first and second chambers with filter orifices or restrictors appears transparent to the acoustic pressure waves. This means that, with a sufficient area of filter material, the motion transmitted from the ground or bottom of the second chamber 13 or 130 to the first chamber 12 or 120 presents no direct coupling between ground to the mass isolated by the vibration isolator 10 or 100. The traditional hole or orifice type of flow restrictor will not provide this degree of transparency to the pressure waves.

Two or more variable gas passages 21 or 210 may be provided in parallel through the pressure barrier 31 or otherwise between chambers 12 and 13 or 120 and 130. In this manner it is possible to vary the gas passage stepwise by selectively activating and deactivating one, two or more of such parallel gas passages, or to render the pressure barrier 31 more permeable than would be possible with a single open flow restrictor 29.

In order to avoid overcrowding, only one flow restrictor 29 is shown in FIG. 1. However, within the scope of the invention, two or more flow restrictors 29, each typically having its own variator, inhibitor or valve 22 in series therewith, may be used in parallel to provide several parallel variable gas flow passages 21 through the pressure barrier 31. By way of example, such two or more variators, inhibitors or valves 22 may be energized by the same control through the same leads as shown at 39 in FIGS. 1 and 3A.

Omitting the flow restrictor 29 and relying on the valve orifice in valve 22 has also produced satisfactory damping in practice. In that case, the valve orifice may constitute a flow restrictor and may be quite large. Such increased permeability of the pressure barrier 31 may further the elimination of a damping chamber (see chamber 130 in FIG. 2), and may permit vibration isolation with only the compliance or spring chamber composed of the combined volumes of chambers 12 and 13 in FIG. 1, as explained above with the aid of equation (1) and thereafter, for the case when one or more gas passages 21 are open.

As shown, for instance, in FIG. 4, the first pneumatic chamber 120 may be structured as a compliance chamber, and the second pneumatic chamber 130 may be structured as a damping chamber for the vibration isolator 100. That may also be the case for the gas flow control embodiment shown in FIG. 1. However, FIG. 1 shows a preferred embodiment in which the first pneumatic chamber 12 is provided with a volume about the vibration isolation piston 14 several times smaller than the volume of the second pneumatic chamber 13.

In this respect, it may be considered that the damping of the motion of the piston 14 or 140 in the isolator 10 or 100 is caused by the pressure rise across the flow restrictor 29 or 290 due to the movement of the piston. The greater the pressure drop for a given flow, the greater the damping force.

The efficiency of the damping restrictor can be defined by the ratio of the initial volume between the piston 14 and the bottom of that first chamber before the stroke to the final volume therebetween after the stroke (V1/V2) and should be as high a figure as possible. For vibrations that produce only small strokes, the only way to obtain a high compression ratio is by reducing the initial volume (V1) as much as practical. In this case, the volume can be as small as permitted by the stroke and side motion of the piston 14 and the bottom and side of the first pneumatic chamber 12 are preferably constructed to these limiting dimensions.

By way of example, if a typical gas volume of the first pneumatic chamber 12 in FIG. 1 is 400 cm$^3$ before the stroke of the piston 14, and is 200 cm$^3$ after the maximum stroke, this yields a compression ratio of approximately two (400/200), which is much better than compression ratios on the order of 1.00 which are typical for vibration isolators such as those described in Dr. DeBra's above mentioned paper.

According to a preferred embodiment illustrated in FIG. 1, the second pneumatic chamber 13 is structured as a compliance chamber in conjunction with the upper chamber 12. Both of these chambers are supplied with compressed gas of a compliance volume, $V_s$, predetermined in terms of natural vibration isolation frequency $\omega_O$ and the first pneumatic chamber 12 is provided by fitting the operating piston 14 with a pressure barrier 31 enclosing about that operating piston a gas volume several times smaller than the compliance volume in the compliance chamber predetermined in terms of natural vibration isolation frequency. The controlled passage of gas 21 is provided from a side of the pressure barrier in the first pneumatic chamber 12 to an opposite side of that pressure barrier 31 in the second pneumatic chamber 13. In the embodiment of FIG. 1, the gas passage 21 extends through the pressure barrier 31 and is controlled by the variator, inhibitor or valve 22 connected in series with the gas flow restrictor 29. A similar arrangement may be provided in FIG. 2 between the compliance chamber 120 and damping chamber 130 of the vibration isolator 100. A variable gas flow restrictor may be employed at 29 or 290 in FIG. 1 and 2 within the scope of the invention.

According to an embodiment of the invention, a pressure differential between the first and second pneumatic chambers 12 and 13 or 120 and 130 is continually measured, and the passage of gas between such first and second pneumatic chambers and a supply of gas to, and exhaust of gas from, the second chamber 13 or 130 are controlled in response to variations in the pressure differential. By way of example, FIG. 1 shows a differential pressure sensor 33 having a first input 34 connected to the first pneumatic chamber, such as via a pressure line 35, and having a second input 36 connected to the second pneumatic chamber 13, such as via a pressure line 37. That differential pressure sensor also has and an output 38 connected to a control input 39 of the gas passage variator 22. As seen in FIGS. 1 and 3, threshold comparator and valve driver circuitry 41 may be used for this and other purposes more fully disclosed below.

The differential pressure sensor 33 may be combined with the gas supply and exhaust control for the first and second pneumatic chambers, including valves 18, 17 and 27, of which valves 17 and 27 may be actuated by the control 41.

The vibration isolators and isolator systems herein disclosed have many uses. One use is illustrated in FIGS. 1, 4, and 5 as supporting a table 43 relative to a surface or floor 44. Three or more vibration isolators 10 or 100 may be used as legs for the table 43 which may, for instance, be of a honeycomb type for optimum vibration isolation or damping.

The pneumatic vibration isolator 10 or 100 supports a load, such as shown in FIG. 1 on top of the table 43. The load is adjusted in height (also known as leveling) by sensing positional variations in that load and by changing gas pressure in the first pneumatic chamber 12 in response to such positional variations. "Load" in this respect may include the table 43 and a mass or objects located thereon. Positional variations of the table or load may be sensed by what is conventionally known as a "leveling valve" (position control valve) shown at 18, which selectively connects the gas supply and exhaust 16 and 25 to the first pneumatic chamber 12 via an adjustable flow restrictor valve 19, until the desired height adjustment of the table 43 or load 46 has been achieved. The variable restrictor 19 serves as a gain adjustment of a height adjustment servo loop including the leveling valve 18 with level or height sensor 51.

For large table displacements, the valve 18 may be considered as a gas supply and exhaust control for the first pneumatic chamber 12 having a control input 49. A load height or level sensor 51 has a load level or height signal output 52 connected to the control input 49 of the gas supply and exhaust control at 18 to adjust the height of the table 43 or load 46 from the floor via the first pneumatic chamber 12 or 120 of the isolator 10 or 100. For small or slow-acting displacements, the valve 18 may be considered a gas supply and exhaust control for chambers 12 and 13, when the valve 22 is open.

In the illustrated preferred embodiments, this is complemented by the variable gas passage 21 or 210 between the first and second pneumatic chambers 12 and 13 or 120 and 130. The gas passage variator 22 or 220 is connected to the variable gas passage between the first and second pneumatic chambers.

As seen in FIG. 1, the gas passage variator may include a gas passage inhibitor at 22 or 220 between the first and second pneumatic chambers, and a pneumatic chamber pressure sensor 33 having a pressure signal sensor output 38. The gas passage inhibitor 22 or 220 has a control input 39 connected to the pressure signal sensor output, such as via a control 41.

Passage of gas between the first and second pneumatic chambers 12 and 13 or 120 and 130 is inhibited in response to shifts in the load 46. In this respect and in general, manufacturing plants and other installations may use several tables in series, such as shown in FIG. 1 for tables 143, 43, and 430 in that order, and the load or workpiece 46 may be transported along this series of tables for succeeding manufacturing processes or for other purposes. On the other hand, two or more tables 43, 143 and 430 may be referred to a single point of reference to support components of the same system. Tables 143 and 430 may be vibration isolated by pneumatic vibration isolators 10 or 100 in the same or a similar manner as the table 43.

In either case, the spring constant or other performance characteristic of the vibration isolator 10 or 100 or of the table 43 may be changed and adapted to particular needs according to the subject invention. For instance, in our above mentioned example, the stiffness of the vibration isolation can be increased by a factor of twenty-five, by closing the valve 22 or, in other words, by activating that inhibitor.

As explained with the aid of FIG. 1 for instance, preferred embodiments of the invention have two control modes. When the system is in its quiescent, or isolation state, and the load changes slowly or not at all, air pressure in chambers 12 and 13 is controlled by position control valve 18.

During rapid load changes, valve 22 closes and the air pressure in chamber 12 only is controlled by the position control valve 18. As long as the valve 22 is closed, pressure in chamber 13 is controlled by pressure differential sensor 33, control 41, and the other system elements such that it tracks pressure in chamber 12.

When the pressures in chambers 12 and 13 are essentially equal long enough for the timer 81, 82 to time out, then valve 22 opens and the system returns to its maximum isolation mode.

It will now be realized that FIGS. 1 to 5 are embodiments of a method of providing intermittent stabilization of a load table 43 supported by pneumatic vibration isolators 10 or 100, comprising, in combination, supplying gas to these vibration isolators for pneumatic vibration isolation of a load 46, sensing a shift in that load, such as with a sensor 33 or 330, increasing passage of gas to the pneumatic vibration isolators in response to such sensing of a shift in the load, and preventing oscillation of the pneumatic vibration isolators by imposing damping on the load table in response to that sensing of a shift in the load.

According to FIGS. 1 and 4, required damping is imposed with an auxiliary damper 54 or 540 separate from the pneumatic vibration isolators 10 and 100, and such auxiliary damper is activated in response to the sensing of a shift in the load.

The auxiliary damper 540 shown in FIG. 4 is provided with two corresponding chambers 541 and 542 in which gas pressure is increased and decreased, respectively. The damper may be activated by decreasing gas passage between the chambers by controlling valve 108.

Where the auxiliary damper is provided with two corresponding chambers 541 and 542 as in FIG. 4, that auxiliary damper 540 is activated by supplying gas to these corresponding chambers individually through flow restrictors 104 and 105. The above mentioned pressure source 16 or 116 may be connected to the orifices 104 and 105 through a main damper gas supply valve 106.

Two diaphragm-type dampers constituting the two chambers 541 and 542 may be interconnected back-to-back to provide the damper 540. In that case, the damper may be operated from the pressure source 116 at greater than ambient air pressure so that the diaphragms at 541 and 542 do not collapse, but maintain the well-known diaphragm convolute during operation and load tracking.

The auxiliary damper 540 is in effect deactivated by interconnecting the two corresponding chambers 541 and 542 in bypass to the flow restrictors 104 and 105 for pneumatic vibration isolation of the load. The diaphragms of both damper chambers 541 and 542 are connected to the load support 43 via a coupling 107, whereby gas in either damping chamber is expanded, while gas in the other damping chamber is compressed while the normally closed bypass valve 108 is activated or open.

As shown in FIG. 4, a simple toggle or double-throw switch 109 may be used to open the normally closed electropneumatic valve 108 for normal vibration isolation in the "ISOLATE" or upper position of the double-throw switch 109 as seen in FIG. 4. If desired, a damper control of the type shown in FIG. 3B may be used instead, since that control 41 energizes a lead 63 when damping is desired, whereby the electropneumatic valve 108 could be substituted for the electropneumatic valve 64 in the control of FIG. 3A. On the other hand, that function as well as actuation of the switch 109 may be performed by a computer or microprocessor programmed to determine a load shift condition. In this respect and in general, the expression "determining a load shift condition" as herein employed is intended to be broad enough to cover for example a sensing of a shift in the load, such as with a differential sensor 33, or a manual or computerized anticipation or determination of a load shift or load shift condition, such as in the context of a mechanical or physical movement of the load 46 from table to table for different manufacturing or processing steps, for instance. The box surrounding the switch 109 may thus symbolize a load shift controller, for instance.

The expression "load shift determiner" is herein employed to designate load shift sensors, load shift controllers and other apparatus, such as programmed microprocessors, for anticipating or determining a load shift or load shift condition.

If the toggle switch 109 is in the lower or load track position, or if the lead 63 in FIG. 3B is deenergized, then the bypass valve 108 reverts to its normally closed condition whereby the damper 540 is activated, which permits load tracking in response to variations of the load 46 or of other loads on the load support table 43, summarized herein by the generally used term of "load shifting" or "shift in the load."

In that load tracking mode, the amount of damping applied to the vibration isolation system is controlled by the setting of orifices 104 and 105. If these orifices, which for instance may be needle valves, are too far open, then little damping occurs and the system will oscillate. If these orifices 104 and 105 are too far closed, the damper sections 541 and 542 will act as pneumatic springs, applying no damping, permitting oscillation, and rendering the leveling valve system incapable of correcting payload height against the damper pneumatic spring force. Accordingly, the needle valves or other orifices 104 and 105 are adjusted between a system oscillation tendency on the one hand, and pneumatic spring and oscillation action on the other hand.

As already described above, auxiliary damping is in effect discontinued by opening the normally closed shunt or bypass valve 108 for the pneumatic vibration isolation mode of the system.

In the illustrated preferred embodiments of the invention, the load table 43 is leveled by sensing positional variations in that load table and by changing gas pressure in the pneumatic vibration isolators 10 and 100 in response to such positional variations. A leveling valve 18 as described above, or a leveling valve 180 presently described below, may be used for that purpose, causing a supply of gas from the source 16 to the pneumatic isolators when the load or load support level is too low, and effecting conversely exhaustion of gas from the pneumatic isolators when the load or load support level is too high, until a desired load or load support level has been achieved.

According to FIGS. 4 and 5, a high-gain leveling valve is provided at 180. For instance, that leveling valve 180 may have an orifice, diagrammatically indicated at 181, that is so large that unrestricted gas flow through the leveling valve 180 would cause the system to oscillate. A pressure regulator 114 between the pressure source 16 and the leveling valve 180 may be adjusted accordingly. However, to prevent oscillation in the pneumatic vibration isolation mode, gas pressure in the pneumatic vibration isolators 100 is changed in response to positional variations of the load 46 or load support 43 through an orifice or flow restrictor 112, which may be connected in series with the leveling valve 180. In other words, the high gain of the leveling valve 180 is blunted for normal vibration isolation.

On the other hand, passage of gas to the pneumatic vibration isolators 100 is increased and damping is imposed in response to sensing of a shift in the load 46 etc. By way of example, the flow restrictor 112 is bypassed to increase the passage of gas from the source 16 to the pneumatic vibration isolators 100 in response to sensing of a shift in the load. A bypass or gain switch solenoid valve 113 may be used for that purpose. That valve is a normally closed type, so that "low-gain" gas flow takes place for normal pneumatic vibration isolation as long as the toggle switch 109 is in its upper or "isolate position."

Conversely, setting that toggle switch 109 to its lower or "load track" position energizes the valve 113 to restore the high-gain operation of the level control through leveling valve 180. With the flow restrictor 112 thus bypassed, gas can flow from the source 16 to the vibration isolator 100 or chamber 130 to such an extent that the system would be prone to oscillate, were it not for the damping simultaneously imposed by the subject invention, such as through reversion of the other bypass valve 108 to its normally closed condition.

In this and any equivalent manner within the scope of the invention, leveling of the load is quickly restored in response to a load shift. Normal pneumatic vibration isolation is then quickly restored by reverting the gain switch valve 113 to its normally closed condition, while opening the normally closed chamber bypass valve 108, such as by toggling the switch 109 to its upper or "isolate" position.

If desired, the gain switch or load track valve may be operated from the more sophisticated control shown in FIG. 3A. For instance, the gain control valve 113 of FIGS. 4 or 5 may be substituted for the air flow valve 27 in FIG. 3A for a bypass of the orifice 112 for load tracking.

Figure 2:
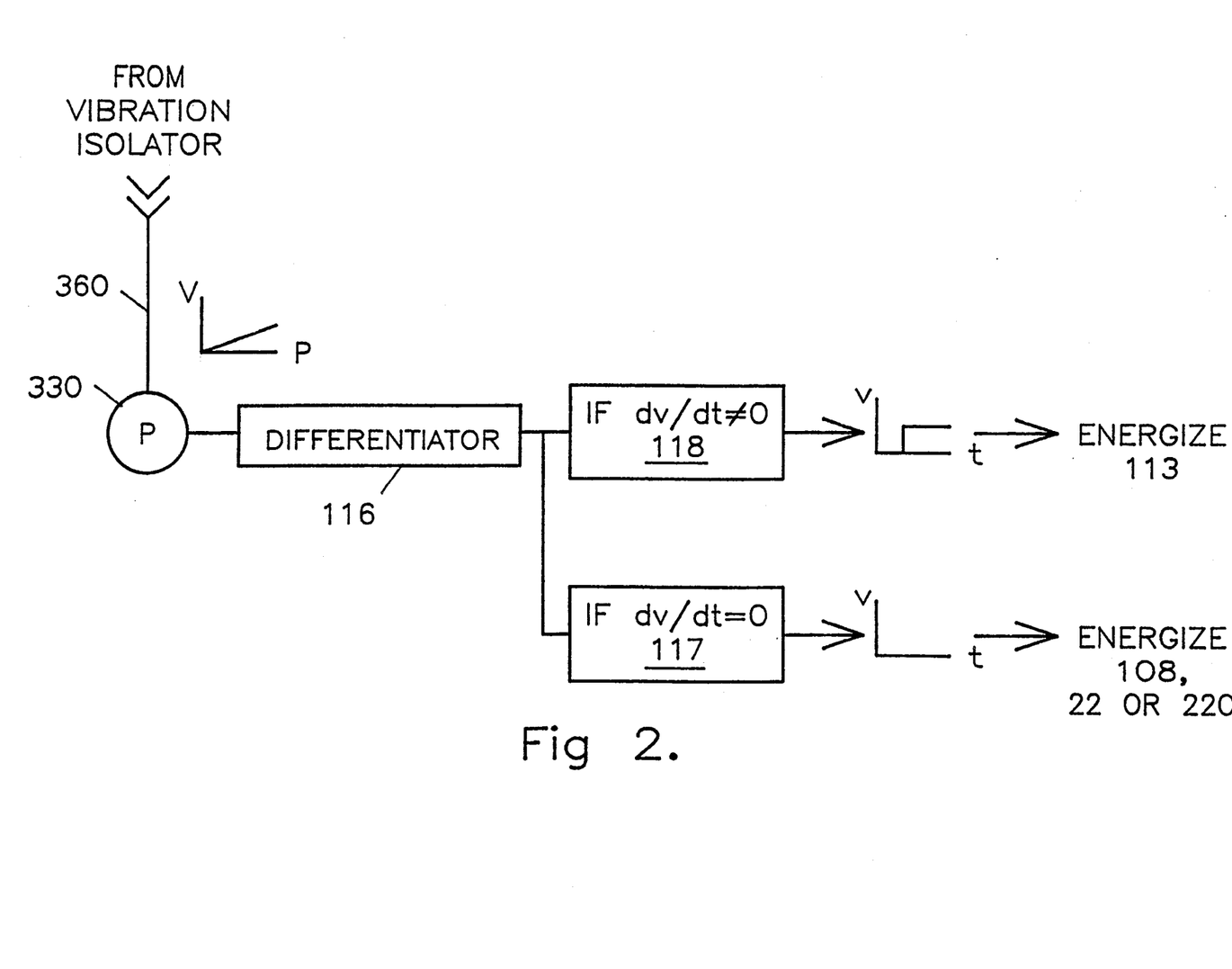
FIG. 2 is a block diagram of a control for initiating stabilization in intervals between normal vibration isolation according to an embodiment of the invention.

Conversely, the damper 54 etc. of FIG. 1 may be used in the embodiment of FIG. 4 in lieu of the damper 540. This would have the advantage of providing an auxiliary damper that is disconnected from the load support in the vibration isolation mode.

Where a simplified version is acceptable, the control illustrated in FIG. 2 may be provided. That control operates with a pressure sensor 330 which may be a differential sensor as at 33 in FIG. 1, or a simple sensor of pressure in the vibration isolator or chamber 13 or 130 via input 36 or 360.

The output of the pneumatic vibration isolator sensor 330 is applied to a differentiator 116 whose input-versus-pressure characteristic is indicated in the v-versus-p graph at block 116 in FIG. 2.

If the differentiator 116 determines a zero differential, as indicated by the block 117 and the lower v-versus-t graph, then the damper deactivation valve 108 shown in FIG. 4 is energized. In terms of FIGS. 1 and 5, the corresponding internal gas flow valve 22 may be deenergized, or valve 220 energized, to permit gas flow between isolator chambers 12 and 13 or 120 and 130 for the vibration isolator mode.

Conversely, if the differentiator 116 determines a differential other than zero, such as shown in the block 118 and the upper v-versus-t graph in FIG. 2, then the gain switch valve 113 is energized for the above mention load shift tracking. Differentiators of the kind of differentiator 116 and their uses are well known, and the function illustrated by the block diagram of FIG. 2 may be computerized or performed by a microprocessor, or performed in the manner shown in FIGS. 3A and B.

It may thus be seen that the toggle switch 109 according to preferred embodiments either is a solid-state switch or is otherwise operated in response to the load shift sensor 33 or 330 or other load shift sensing or a command from a load shift controller.

The pneumatic vibration isolator 100 shown in FIG. 5 again has separate pneumatic chambers 120 and 130 and a vibration isolation piston 140 in one of these pneumatic chambers, such as in the chamber 120. The gas supply for the pneumatic chambers is again shown at 16. There also is a gas passage 210 between the pneumatic chambers, and a selectively actuable gas passage inhibitor 220 connected to that gas passage between the pneumatic chambers 120 and 130.

According to this aspect of the invention, a damping fluid 122 is in one of the pneumatic chambers, such as in the pneumatic chamber 130, and a damping fluid friction passage 123 extends between the damping fluid 122 in the one pneumatic chamber 130 and the other of the pneumatic chambers. According to FIG. 5, that friction passage 123 extends in the form of the tube from the upper or compliance chamber 120 into the damping fluid 122 in the lower or damping chamber 130 of the pneumatic vibration isolator 100. The isolator 100 has a bulkhead 125 through which the gas passage 210 and the tubular friction passage 123 extend.

The load table leveling valve 180 and gas flow restrictor 112 are again in series between the gas supply 16 or regulator 114 and the pneumatic chambers, such as the lower chamber 130.

The gain switching valve or selectively actuable bypass 113 is again connected to the load shift sensor 109 or 330 (e.g. FIG. 2) and extends around the flow restrictor 112 whereby to increase gas flow to the pneumatic chambers or chamber 130 in response to sensing a shift in the load 46.

According to the aspect of the invention shown in FIG. 5, the damper is integrated in the pneumatic vibration isolator or isolators 100, and damping is imposed by actuating that integrated damper in response to sensing a shift in the load 46, such as with the shift sensor 330 acting on the solid state or electromechanical "toggle switch" 109.

The controlled gas passage or passages 210 provided between said separate first and second pneumatic chambers 120 and 130 for pneumatic vibration isolation of the load is or are inhibited, such as by actuation of the switch 109 to its lower or "load tracking" position resulting in reversion of the normally closed gas passage valve 220 to its closed or inhibitor condition. Internal damping is also effected between the separate first and second pneumatic chambers 120 and 130 in response to sensing of a shift in the load, such as by the pressure sensor 330 acting on the solid-state or electromechanical toggle switch 109.

Damping is imposed by providing friction of the damping fluid 122 with the tube 123 in response to sensing a shift in the load 46. In particular, free passage of gas between the first and second pneumatic chambers 120 and 130 is inhibited, such as by closure of the valve 220, and gas is supplied to the pneumatic chambers while thus inhibiting passage of gas between the first and second pneumatic chambers and thus forcing flow of fluid 122 in the tube 123 which dampers the system.

For instance, where gas pressure in the pneumatic vibration isolators 100 is changed in response to the above mentioned load shift or change through a flow restrictor 112, such flow restrictor is bypassed to increase the passage of gas to the pneumatic vibration isolators in response to a sensing or other determination of a shift in the load, such as with a valve or bypass 113 extending around that gas flow restrictor 112, and having a control input 213 connected to the load shift sensor 109 actuated by the pressure sensor 330 or by control circuitry shown in FIGS. 2 or 3A as disclosed above.

Pressurized gas thus applied to the lower chamber 130 acts on the damping fluid 122 and forces part thereof into the friction passage or tube 123, resulting in friction and energy loss, providing damping which keeps the system from oscillating despite the high gain of the enlarged leveling valve 180 with bypassed series flow restrictor 112. This permits the system or load support 43 to adjust rapidly to the shifted load condition.

If thereafter the sensor 330 or other determiner signals such an adjustment and acts on the control shown in FIGS. 3A and B, or in FIG. 2, or at 109 in FIG. 4, the system resumes its normal pneumatic vibration isolation function, such as by closure of the bypass at 113 and opening of the gas flow passage at 220 in the manner described above.

The vibration isolator 100 may then be operated with chamber 120 acting as a compliance chamber and chamber 130 acting as a damping chamber 130 such as pursuant to Equation (11) set forth above.

Alternatively, the bulkhead 125 may be shaped as a gas flow barrier as disclosed above in connection with FIG. 1 showing a controlled gas flow barrier 31, in which case pneumatic vibration isolation operates pursuant to Equation (8) set forth above.

The damping fluid 122 may be oil or another medium having higher density or friction characteristics than the gas or compressible fluid in chamber 12, 13 or 120 or in the upper portion of chamber 130.

In practice, three or more of the pneumatic vibration isolators are installed under a table or other payload in the manner of a conventional isolation system. Vertical displacement control and roll control about the horizontal axes in response to changing loads will be provided in addition to the vertical isolation of the conventional system. A pendulum suspension of the type shown in FIG. 1 at 9 or as disclosed in U.S. Pat. No. 3,784,146, by John W. Matthews, Ph.D., issued Jan. 8, 1974 for Horizontal Vibration Isolation System, or an assembly of the type shown in U.S. Pat. No. 4,360,184, by Willis J. Reid, issued Nov. 23, 1982 for Pneumatic Device for Attenuation of Vertical, Horizontal and Rotational Dynamic Forces (both herewith incorporated by reference herein), may be provided in the piston 14 or 140 herein shown, to address horizontal motion or rotation about the vertical axis resulting from acceleration of masses on the payload.

Alternatively or additionally, six vibration isolators 100 with internal damping system modules, such as shown in FIG. 5, can be arranged to provide vertical support for the payload and add high damping to resist horizontal motion and rotation about the vertical axis. One such implementation would be to support the payload with a "hexapod" arrangement of three non co-planar pairs of isolators. Each isolator pair would be configured as a bipod with the isolator pistons affixed to a common point on the payload. Such a structure of six non-parallel legs (hexapod) provides rigid six-axis positioning for the payload when the legs are rigid. In this implementation, height of the payload would be controlled by a level control valve for each pair of isolators. Horizontal motion would be heavily damped in the load tracking mode and free to provide isolation in the isolate mode. In the same manner, three or more standard isolators such as those shown in FIGS. 1 and 4 can be used to support the payload while six of the auxiliary or external pneumatic dampers could be arranged in hexapod or other fashion to provide six-axis damping to the payload while loads are shifting or changing.

Alternatively, auxiliary dampers of the type shown in FIGS. 1 and 4 may be arranged in a hexapod or other configuration which provides six-axis control of damping to the table or load supported by pneumatic isolators.

The subject extensive disclosure will render apparent or suggest to those skilled in the art various modifications and variations within the spirit and scope of the subject invention and equivalents thereof.

We claim:

1. A method of providing intermittent stabilization of a load table supported by pneumatic vibration isolators, comprising in combination:
   supplying gas to said vibration isolators for pneumatic vibration isolation of a load;
   determining a load shift condition;

increasing passage of gas to said pneumatic vibration isolators and preventing oscillation of said pneumatic vibration isolators by imposing damping on said load table in response to said load shift condition; and discontinuing said damping and reducing said passage of gas to said pneumatic vibration isolators for pneumatic vibration isolation of a load after cessation of said load shift condition.

2. A method as in claim 1, wherein:

said damping is imposed with an auxiliary damper separate from said pneumatic vibration isolators; and said auxiliary damper is activated in response to said sensing of a shift in said load and is deactivated for pneumatic vibration isolation of a load.

3. A method as in claim 2, wherein:

said auxiliary damper is provided with two corresponding chambers in which gas pressure is increased and decreased, respectively.

4. A method as in claim 3, wherein:

said auxiliary damper is activated by decreasing gas passage between the chambers in response to a load shift condition and is deactivated by opening up gas passage between the chambers for vibration isolation of a load by said vibration isolators after cessation of said load shift condition.

5. A method as in claim 2, wherein:

said auxiliary damper is provided with two corresponding chambers;

said auxiliary damper is activated by supplying gas to said corresponding chambers individually through flow restrictors; and said auxiliary damper is deactivated by interconnecting said two corresponding chambers in bypass to said flow restrictors for pneumatic vibration isolation of said load by said vibration isolators.

6. A method as in claim 1, including:

integrating a damper in said pneumatic vibration isolators;

imposing said damping by actuating said integrated damper in response to said sensing of a shift in said load; and deactivating said integrated damper after cessation of said load shift condition.

7. A method as in claim 1, wherein:

said pneumatic vibration isolators include separate first and second pneumatic chambers;

gas passages are provided between said separate first and second pneumatic chambers for pneumatic vibration isolation of said load; and said gas passage for pneumatic vibration isolation are inhibited and internal damping is effected between said separate first and second pneumatic chambers in response to said load shift condition; and said gas passages are restored between said separate first and second pneumatic chambers for pneumatic vibration isolation of a load by said pneumatic vibration isolators after cessation of said load shift condition.

8. A method as in claim 7, wherein:

a damping fluid is provided in one of said separate first and second pneumatic chambers; and said damping is imposed by providing internal friction with said damping fluid in response to said load shift condition.

9. A method as in claim 1, wherein:

said pneumatic vibration isolators including first and second pneumatic chambers and a vibration isolation piston operating relative to said pneumatic chambers;

a controlled passage of gas between said first and second pneumatic chambers is provided for pneumatic vibration isolation;

passage of gas between said first and second pneumatic chambers is inhibited and said damping is imposed in response to said load shift condition; and vibration isolation of a load by said vibration isolators is restored by restoring passage of gas between said first and second pneumatic chambers.

10. A method as in claim 9, wherein:

gas is supplied to said pneumatic chambers while inhibiting passage of gas between said first and second pneumatic chambers.

11. A method as in claim 1, wherein:

said load table is leveled by sensing positional variations in said load table and by changing gas pressure in said pneumatic vibration isolators in response to said positional variations;

passage of gas to said pneumatic vibration isolators is increased and said damping is imposed in response to said load shift condition; and vibration isolation of a load by said vibration isolators is restored by decreasing passage of gas to said pneumatic vibration isolators after cessation of said load shift condition.

12. A method as in claim 11, wherein:

said gas pressure in said pneumatic vibration isolators is changed in response to said positional variations through a flow restrictor;

said flow restrictor is bypassed to increase said passage of gas to said pneumatic vibration isolators in response to said load shift condition; and bypass of said flow restrictor is terminated after cessation of said load shift condition.

13. A method as in claim 1, wherein:

said load shift condition is determined by sensing a shift in said load; and said load shift condition is a shift in said load.

14. A pneumatic vibration isolator system, comprising in combination:

a load table;

pneumatic vibration isolators supporting said load table;

a gas supply for said vibration isolators;

a load shift determiner;

means connected to said load shift determiner for increasing passage of gas to said pneumatic vibration isolators in response to a load shift condition, including means for preparing said pneumatic vibration isolators for pneumatic vibration isolation of a load by decreasing passage of gas to said pneumatic vibration isolators after cessation of said load shift condition; and means for imposing damping on said load table in response to said load shift condition, including means for deactivating said damping upon cessation of said load shift condition.

15. A pneumatic vibration isolator system as in claim 14, wherein:

said means for imposing damping include an auxiliary damper separate from said pneumatic vibration isolators; and means for activating said auxiliary damper in response to said load shift condition, including means for preparing said pneumatic vibration isolator for pneumatic vibration isolation by deactivating said auxiliary damper upon cessation of said load shift condition.

16. A pneumatic vibration isolator system as in claim 14, wherein:

said means for imposing damping include an auxiliary damper with two corresponding chambers, flow restrictors between said two corresponding chambers and said gas supply, and a bypass between said flow restrictors adapted to be selectively deactivated in response to said load shift condition and conversely to be activated in response to cessation of said load shift condition.

17. A pneumatic vibration isolator system as in claim 14, wherein:

said means for imposing damping include a damper integrated in said pneumatic vibration isolators, and means for activating said integrated damper in response to said load shift condition, including means for deactivating said integrated damper upon cessation of said load shift condition.

18. A pneumatic vibration isolator system as in claim 14, including:

a load table leveling valve and gas flow restrictor in series between said gas supply and said pneumatic vibration isolators;

said means for increasing passage of gas to said pneumatic vibration isolators including a bypass around said gas flow restrictor in response to said load shift condition, and means for preparing said pneumatic vibration isolators for pneumatic vibration isolation of a load by closing said bypass after cessation of said load shift condition.

19. A pneumatic vibration isolator system as in claim 14, wherein:

said load shift determiner is a load shift sensor; and said load shift condition is a shift in said load.

20. A pneumatic vibration isolator system, comprising in combination:

a load table;

pneumatic vibration isolators each having separate pneumatic chambers for supporting said load table;

a vibration isolation piston in one of said pneumatic chambers;

a gas supply for said pneumatic chambers;

a gas passage between said pneumatic chambers;

a selectively actuable gas passage inhibitor connected to said gas passage between said pneumatic chambers;

a damping fluid in one of said pneumatic chambers; and a damping fluid friction passage between said damping fluid in said one pneumatic chamber and the other of said pneumatic chambers;

a load shift determiner;

means connected to said load shift determiner for increasing passage of gas to said pneumatic vibration isolators in response to a load shift condition and for conversely preparing said pneumatic vibration isolators for pneumatic vibration isolation of a load by decreasing passage of gas to said pneumatic vibration isolators after cessation of said load shift condition; and means for activating damping fluid friction by activating said gas passage inhibitor in response to said load condition and for conversely preparing said pneumatic vibration isolators for pneumatic vibration isolation of a load by deactivating said gas passage inhibitor after cessation of said load shift condition.

21. A pneumatic vibration isolator as in claim 20, including:

a load table leveling valve and gas flow restrictor in series between said gas supply and said pneumatic chambers; and a selectively actuable bypass connected to said load shift determiner and extending around said flow restrictor whereby to increase gas flow to said pneumatic chambers in response to said sensing of a shift in said load.

22. A pneumatic vibration isolator as in claim 21, wherein:

said load shift determiner is a load shift sensor; and said load shift condition is a shift in said load.

* * * * *